United States Patent [19]
Hollywood

[11] 3,900,960
[45] Aug. 26, 1975

[54] TRAINING AID FOR LEARNING NUMBERS

[76] Inventor: Walter P. Hollywood, 1679 Casa Grande, Pasadena, Calif. 91104

[22] Filed: Sept. 30, 1974

[21] Appl. No.: 510,776

[52] U.S. Cl. .................... 35/32; 35/31 D; 35/70; 35/73
[51] Int. Cl. .................... G09b 19/02; G09b 1/06
[58] Field of Search .......... 35/30, 31 R, 31 B, 31 D, 35/31 G, 31 H, 32, 69, 70, 71, 72, 73; 40/135

[56] References Cited
UNITED STATES PATENTS

| | | | |
|---|---|---|---|
| 1,151,279 | 8/1915 | Lewis | 35/73 |
| 1,854,999 | 4/1932 | Ralls | 35/70 |
| 2,188,480 | 1/1940 | Murray | 35/31 D X |
| 2,454,632 | 11/1948 | Cohn | 35/35 J |
| 2,950,542 | 8/1960 | Steelman | 35/70 X |
| 3,381,394 | 5/1968 | Munro | 35/31 F |
| 3,696,533 | 10/1972 | Mortensen | 35/70 |
| 3,811,205 | 5/1974 | Pitzler | 35/32 |

FOREIGN PATENTS OR APPLICATIONS

| | | | |
|---|---|---|---|
| 793,864 | 12/1935 | France | 35/71 |
| 850,491 | 10/1960 | United Kingdom | 40/135 |

Primary Examiner—Wm. H. Grieb
Attorney, Agent, or Firm—Donald D. Mon

[57] ABSTRACT

Grooves representing numbers are formed in a baseboard or base pieces and flexible modules all of a unit length equal to the length of the number one are supplied for fitting into respective grooves. The groove for each number has a length which is that multiple of the length of the groove for number one which that number represents. Thus, the length of the groove for number two is twice the length of the groove for number one, the length of the groove for number three has three times the length of the groove for the number one, and so on. A single flexible module fills the groove for number one, two flexible modules placed end-for-end fill the groove for number two, three flexible modules placed end-to-end fill the groove for number three, and so on. Alternatively, the flexible modules may be made in the appropriate multiples of unit length, in order that their respective lengths can be compared.

6 Claims, 6 Drawing Figures

PATENTED AUG 26 1975  3,900,960
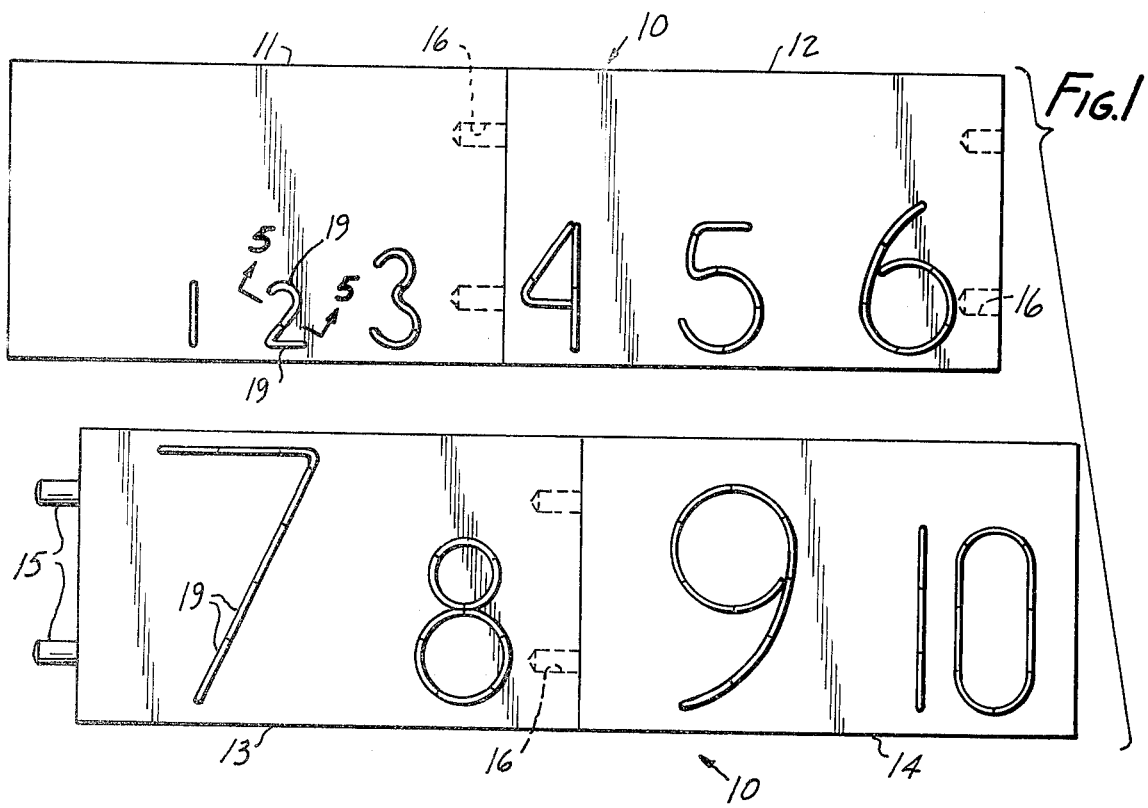
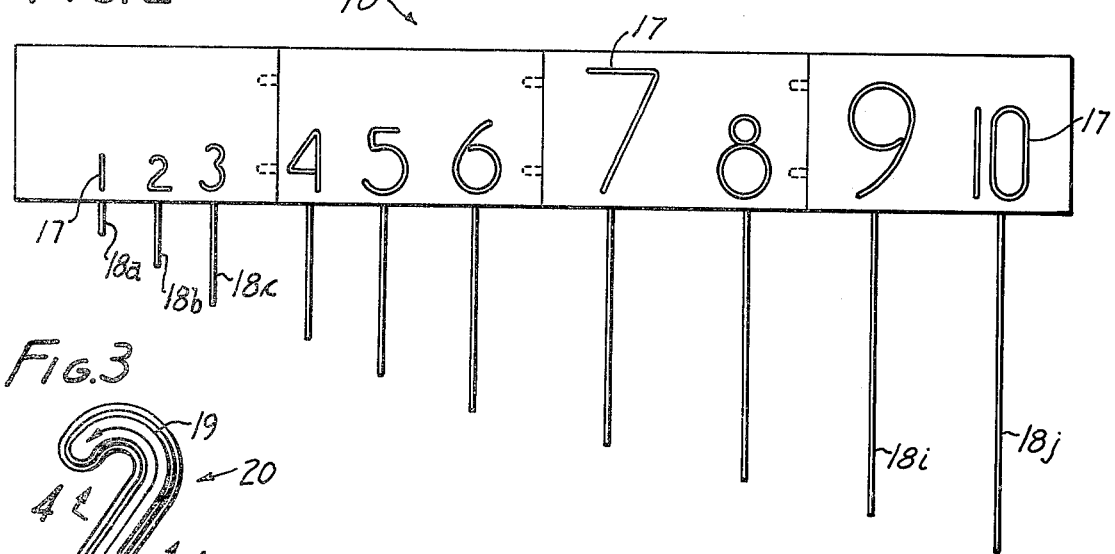
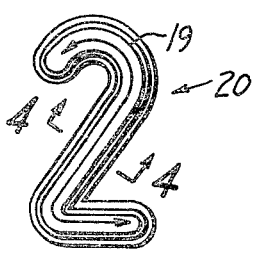
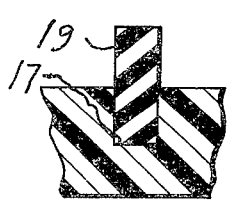
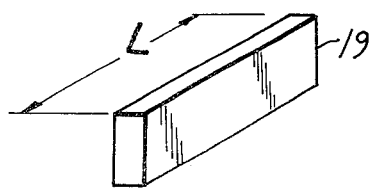

_3,900,960_

TRAINING AID FOR LEARNING NUMBERS

This invention relates to educational and training aids, particularly for young children, in learning the value of numbers.

In teaching very young children to count and to understand the values of numbers various forms of teaching aids have long been in use. Most of these are visual aids such as the use of cards containing numbers and the like.

An object of the present invention is to provide physical equipment for the child to handle whereby he may observe not only visually, but also manually by his own handling, the relative values of numbers.

The invention is carried out by provision of a base or board containing a groove in the shape of a number together with separate flexible modules which in the preferred embodiment are all of a unit size which the child may pick up and place in the grooves. The linear dimensions of the modules relative to the linear length of the groove indicates the relative value of the number. Thus, there may be one unit length module which when fitted into the groove for the number one will fill that groove, two such unit modules placed end-to-end will fill the groove for the number two, three such unit modules placed end-to-end will fill the groove for the number three, and so on. Alternatively, the flexible modules may be made in the appropriate multiple of unit length, so they fit in their respective grooves.

The modules are flexible so that they may be conformed to the contours and corners of the grooves representing the numbers.

A preferred feature resides in the use of modules which when inserted into the grooves will protrude upwardly from the groove so that the module may be readily inserted or removed from the groove.

In one aspect of the invention, the grooves representing the numbers are formed in a board.

In another aspect of the invention the grooves are formed in separate individual base members which are separate from each other.

A preferred feature when a board is used for the grooves for a plurality of numbers, is the attachment of strips adjacent respective numbers, the lengths of the respective strips relative to each other being in proportion to the value of the respective numbers. Thus, the length of the strip for the number two will be twice as long as the length of the strip for the number one, the length of the strip for the number three will be three times as long as the length of the strip for the number one, and so on.

By use of this arrangement and system it should be apparent that a child may learn not only visually but by physical and manual handling the relative values of numbers in the numbering system.

The foregoing and other features of the invention will be better understood from the following detailed description and the accompanying drawing of which:

FIG. 1 illustrates parts of a board containing grooves in the form of numbers, adapted to be fitted together, according to this invention;

FIG. 2 illustrates the board having all the parts illustrated in FIG. 1 fitted together, on a smaller scale than FIG. 1, and having a strip attached thereto adjacent each groove representing a number;

FIG. 3 is a plan view of a base piece containing a groove, formed in the shape of numberal 2, according to this invention;

FIG. 4 is a cross-section view taken at line 4—4 of FIG. 3;

FIG. 5 is a cross-section view taken at line 5—5 of FIG. 1; and

FIG. 6 illustrates a flexible module member adapted to be inserted in a groove of FIGS. 1, 2 or 3.

Referring to the drawing, FIG. 1 shows parts of a base board 10 comprising four sections 11, 12, 13 and 14 adapted to be fitted together end-for-end to form the linear board 10 as best seen in FIG. 2, adjacent sections being fitted and secured to each other by means of dowel pins 15 protruding from an edge of one section into corresponding holes 16 of an adjacent section. A straight dowel pin making a close fit in a corresponding hole is the preferred means for joining the sections. However, for long use, it may be preferred to provide the pin with a snap or expansion feature which will serve as means to hold the sections in their assembled condition.

As best seen in FIG. 2, the board 10 is provided with grooves 17 indented from its upper surface, these grooves being in the form of numbers which in this case are numbered consecutively from one through ten. It is noted that each groove representing a number has a lineal length which is a multiple of the length of the groove representing the number one. Thus, the lineal length of the groove for the number two is twice as long as the groove for the number one, and the lineal length of the groove for the number three is three times as long as the length of the number one groove, and so on.

At the edge of the board there are detachably attached a number of strips 18a through 18j, preferably of a flexible material, there being one such strip beneath each groove representing a number. The length of each strip 18a–18j adjacent each grooved number is the same as the lineal length of the groove representing that number. Thus, the strip 18b at the groove representing number two is twice as long as the length of the groove 18a adjacent the groove for number one, and the strip 18c at number three is three times as long as the length of the strip 18a for the number one, and so on. This is to say that these strips are as long as the multiple of their number and the unit length, so they will fit precisely into the groove for the number they represent. This is an alternative means of teaching the relative number of units in each number.

There will be used with the board a substantial number of flexible modules 19 all of the same length L, one of which is shown in FIG. 6. These have a rectangular cross-section with a width the same as the width of each of the grooves of the board so that the narrow dimension can be readily but fairly snugly fitted into the groove. The length L of each module is the same as the length of strip 18a and of the groove 17 representing the number one. Thus one such module, and no more can be fitted into the groove 17 representing the number one. Two such modules placed end-to-end can be fitted into the groove representing the number two as illustrated in FIG. 1. Three of the unit modules will be needed to fill the groove representing the number three and four such modules will be needed for the number four, and so on. The modules are of a rubbery or rubber-like material flexible enough so that they can be bent around the curves and corners of the respective grooves. These modules extend significantly upwardly from the surface of the board as illustrated in FIG. 5 so that they can readily be placed in, and taken out of, the groove.

FIG. 3 illustrates a modification of the invention, which instead of using a long board as the base for all the grooves of all the numbers, uses a separate base piece for each number. Thus in FIGS. 3 and 4 there is illustrated a piece 20 having a flat base 21 and a portion 22 upstanding from the base, provided with a groove 23. The particular piece 20 shown in FIGS. 3 and 4 is shaped with its groove to represent the number two so that two of the unit modules 19 placed end-to-end in the groove will fill it.

From the foregoing description and the drawing it should be apparent that this invention has great value as an educational and training aid for young children for they can visually and also manually observe the relationship between the values of numbers. They can visually see that the number two has twice the value of the number one, that the number three has three times the value of the number one, and so on. They can see this not only from the lengths of the strips attached to the board 10 beneath the respective numbers but they can also handle the unit modules and observe how many such modules it takes for them to fill the grooves corresponding to the numbers. They may also receive an elementary education in addition. For example, by removing all of the modules in the grooves for the numbers three and four, and using them to fill the groove for the number seven they may observe that three and four taken together have the value of seven. This is a means for the student himself to discover the additive combinations, because the filling of a groove with two or more individual strips, for example of five and three to fill the eight groove, teaches the sum and its components.

As an added feature it may be preferable to color code each number by coloring its groove or the area around its groove with a different color for each number, and also provision may be made for providing the same color code for the modules. In such case there would be at least one module with the color of the number one, for example green. There would likewise be at least two modules colored red, for example, for the number two, and so on.

It will be understood that the embodiments of the invention illustrated and described herein are given by way of illustration and not of limitation, and that modifications or equivalents or alternatives within the scope of the invention may suggest themselves to those skilled in the art. I claim:

1. A training aid comprising base means containing groove means formed in the shapes of a plurality of numbers, a first of which is the number one, the linear length of a second of said numbers being as many times the linear length of the number one as said second number is a multiple of the number one, and a plurality of flexible modules of equal length, the length of each module being equal to said linear length of the number one.

2. A training aid according to claim 1 in which said groove means includes additional shapes of numbers other than said first and second numbers, the linear length of each number other than the number one having the length which is that multiple of the linear length of the number one which is the multiple which the respective number bears to the number one.

3. A training aid according to claim 1 in which the base means comprises a board.

4. A training aid according to claim 3 in which the groove means comprises a separate groove for each number of the board.

5. A training aid according to claim 4 in which there is detachably attached to the board adjacent each groove formed as a number, a strip of a linear length which is that multiple of the linear length of the groove forming the number one which is the multiple which the respective number bears to the number one.

6. A training aid comprising base means containing groove means formed in the shapes of a plurality of numbers, a first of which is the number one, the linear length of a second of said numbers being as many times the linear length of the number one as said second number is a multiple of the number one, and a plurality of flexible strips of linear length which is that multiple of the linear length of the groove forming the number one which is the multiple which the respective number bears to the number one, there being one such strip for each groove.

* * * * *